(12) United States Patent
Croft

(10) Patent No.: US 6,491,062 B1
(45) Date of Patent: Dec. 10, 2002

(54) REMOTELY CONTROLLED WATER LINE SHUT OFF SYSTEM

(76) Inventor: Thomas Croft, 60 Sea Croft Rd., Santa Rosa Beach, FL (US) 32459

( * ) Notice: Subject to any disclaimer, the term of this patent is extended or adjusted under 35 U.S.C. 154(b) by 0 days.

(21) Appl. No.: 10/127,000

(22) Filed: Apr. 22, 2002

(51) Int. Cl.[7] ............................................... A01G 25/16
(52) U.S. Cl. ...................... 137/624.11; 239/69; 239/70; 251/129.04
(58) Field of Search ....................... 137/624.11, 624.12; 239/67, 68, 69, 70; 251/129.04

(56) References Cited

U.S. PATENT DOCUMENTS

| | | | |
|---|---|---|---|
| 6,098,898 A | * | 8/2000 | Storch ....................... 239/70 X |
| 6,119,720 A | | 9/2000 | Isaacson, Jr. et al. |
| 6,202,679 B1 | | 3/2001 | Titus |
| 6,259,955 B1 | | 7/2001 | Brundisini et al. |
| 6,259,970 B1 | | 7/2001 | Brundisini |
| 6,337,635 B1 | * | 1/2002 | Ericksen et al. .... 137/624.11 X |

\* cited by examiner

*Primary Examiner*—Kevin Lee
(74) *Attorney, Agent, or Firm*—William B. Noll

(57) ABSTRACT

A remotely controlled water line shut off system having particular utility as a convenient means to avoid internal water damage to a dwelling, or to the excessive use of water through a sprinkler system, where the dwelling is not occupied continuously, such as a summer rental. System includes a housing or enclosure mounted between a water intake and water discharge lines, where the housing includes a water meter, a water cut off valve, a preset quantity control metering mechanism, a solid state radio transceiver, and an electrical power source, where controlling thereof may be by wireless communication with the solid state radio transceiver.

8 Claims, 2 Drawing Sheets

REMOTELY CONTROLLED WATER LINE SHUT OFF SYSTEM

FIELD OF THE INVENTION

This invention is directed to a remotely controlled shut off system for a water line to a structure, such as a residence, where such a system has particular utility in vacated structures unihabited for various periods of time by absentee owners.

BACKGROUND OF THE INVENTION

The present invention relates to a remotely controlled water line shut off system to prevent serious water damage to the interior of a structure, or excessive use of water through a broken sprinkler system, where it is especially useful in unattended structures, such as a vacation home. Often residents vacate premises over a long period of time whereby either internal or external water discharging continuously can cause serious damage or high water bills. Also, rental properties often leave the water on between rentals for sometimes months at a time and ruptures unattended can cause serious damage before they may even be aware of the problem.

Such serious damage can be one of the most catastrophic types of damage which can occur to one's home, particularly an unattended or unknown broken or leaking water line. Since water supply lines may run throughout a house or other building, a leak may occur in the heart of the house or other building, and may result in extensive damage both to the structure and to the contents prior to the water supply being manually shut off.

The main causes of runaway water leakage are ruptured pipes, tubes or fittings; faulty washing machine hoses, water heaters, supply lines and other plumbing equipment; rusty or aging components, electrolysis, poor installation practices, poor quality materials, frozen pipes, tubes or hoses, earthquake activity and pressure surges. With so many different factors that can create plumbing failures and runaway water leaks, one can readily realize the need for a fluid shutoff safety device. Flooding in a home or other building brings water damage resulting in extensive destruction and expense. Massive difficulties ensue in the wake of interior structural flooding as families and businesses must contend with problems including substantial loss of time, money and the home, office or other building involved.

Automated systems for controlling water flow into a residence and/or water sprinkler systems have been known and published in the prior art, where exemplary systems are described in the following U.S. Patents:

a.) U.S. Pat. No. 6,119,720, to Isaacson et al., teaches a flood control device for measuring fluid flow into a house or building and shuts off the fluid flow if measured flow conditions indicate an overly high consumption due to a leak, break, or other abnormal condition which is present in the plumbing system of the house or building. Briefly, the device thereof is a cutoff valve relating to a counting or measuring mechanism which in turn, when triggered, shuts down the shut off valve.

b.) U.S. Pat. No. 6,202,679, to Titus, relates to a system for controlling demand of a fluid. The system includes measuring a fluid supply pressure in a supply pipe, determining that the fluid supply pressure is lower than a predetermined threshold supply pressure, and directing a control signal from the fluid information unit to the one or more demand control units to reduce demand for the fluid. In addition, the system includes means for measuring density of a fluid flowing through a demand pipe. Additionally, means are provided for determining that fluid flow through the demand pipe is stable, measuring fluid flow rate through the demand pipe, preventing the fluid from flowing into the demand pipe for a sample period of time, measuring a drop in fluid pressure in the demand pipe during the sample period, and determining the density from the measured pressure drop. Finally, a utility meter for metering a fluid flowing through a supply pipe and a demand pipe having an audible indicator to provide an audible signal to a user is provided.

c.) U.S. Pat. No. 6,259,955, to Brundisini, et al., describes an electronic control unit comprising an electronic circuit with a programmable processing unit and operating buttons to execute and to vary manually the programming of the processing unit and a display for the visualization of the programming stages. The programmable processing unit is organized to individuate a programming menu that is subdivided into a plurality of parts selectionable at will. Each part comprising at least one chapter. The chapter being formed of at least one setting page of at least one respective programming parameter, and in that each part of the menu is directly selectionable by pressure on at least one respective operating button. To summarize, the system thereof relates to an electronic control unit comprising an electric circuit with a programmable processing unit, operating buttons to execute and to vary the programming of said processing unit, and a display for the visualization of the programming stages. Further, it deals with a secondary watering system rather than the primary water supply.

d.) U.S. Pat. No. 6,259,970, to Brundisini, is directed to an electronic interface associable to an electronic control unit for an automatic watering system for the remote controlled management of the watering system. The electronic unit has a plurality of output lines suitable to control a respective plurality of electro-valve lines of the watering system. The electronic interface includes a microprocessor, a connector for connecting the electronic interface with the watering system, a first interface with at least one communication channel having a remote controlled management apparatus, a second interface with a first plurality of input lines connectable with respective output lines of the control unit to control directly the electro-valves, and a first memory associated with the microprocessor in such a way that the microprocessor can detect the changes of state of the output lines of the control unit and store the changes of state in the first memory. The microprocessor can communicate the changes of state to the remote controlled management apparatus, upon request. Briefly, the system thereof relates to a programmable electric control unit for controlling an automatic watering system, and differs from the invention hereof, as it deals with a secondary watering system and not the primary water supply.

The present invention, directed to a remotely controlled water line shut off system, differs from the foregoing prior art in a number of aspects. The manner by which this invention differs will become more apparent in the description which follows, particularly when read in conjunction with the accompanying drawings.

SUMMARY OF THE INVENTION

This invention relates to a remotely controlled water line shut off system that has particular utility for use at dwellings that are not continuously occupied, such as summer rentals, and the like, by way of example. The system of the invention may be remotely controlled from several locations, such as in the dwelling or by a remote handheld means outside the dwelling. The major component of the system is an inground mounted housing, such as fabricated from PVC, positioned in line with the water conduit for metering and controlling the flow of water to the dwelling and ancillary systems, such as a sprinkler system, where the housing includes an incoming water meter, a cut off valve mechanism down stream therefrom, and means for activating the cut off valve mechanism. The means includes a storage battery and above ground solar collector for maintaining said battery, a preset water meter to allow the dwelling owner or agent to preprogram the quantity of water allowed to flow before an automatic shut off, a solid state radio transceiver mounting an antenna for remotely operating same, and a lawn sprinkler over ride cut off sensor and a cut off switch.

Accordingly, a feature of this invention is a system to remotely control water flow input to a dwelling and ancilliary systems, such as a lawn sprinkler, to prevent unnecessary damage due to water breaks or leakage.

Another feature hereof is the provision of a built in override system to allow the dwelling owner/agent to override the system to allow water flow in a predetermined quantity.

Still another feature of the invention is the provision of a remotely controlled water line shut off system operable by a storage battery supported by a solar collector.

These and other features of the invention will become clearer in the description which follows, especially when read along with the attached drawings.

DETAILED DESCRIPTION OF PREFERRED EMBODIMENT

Figure 1:
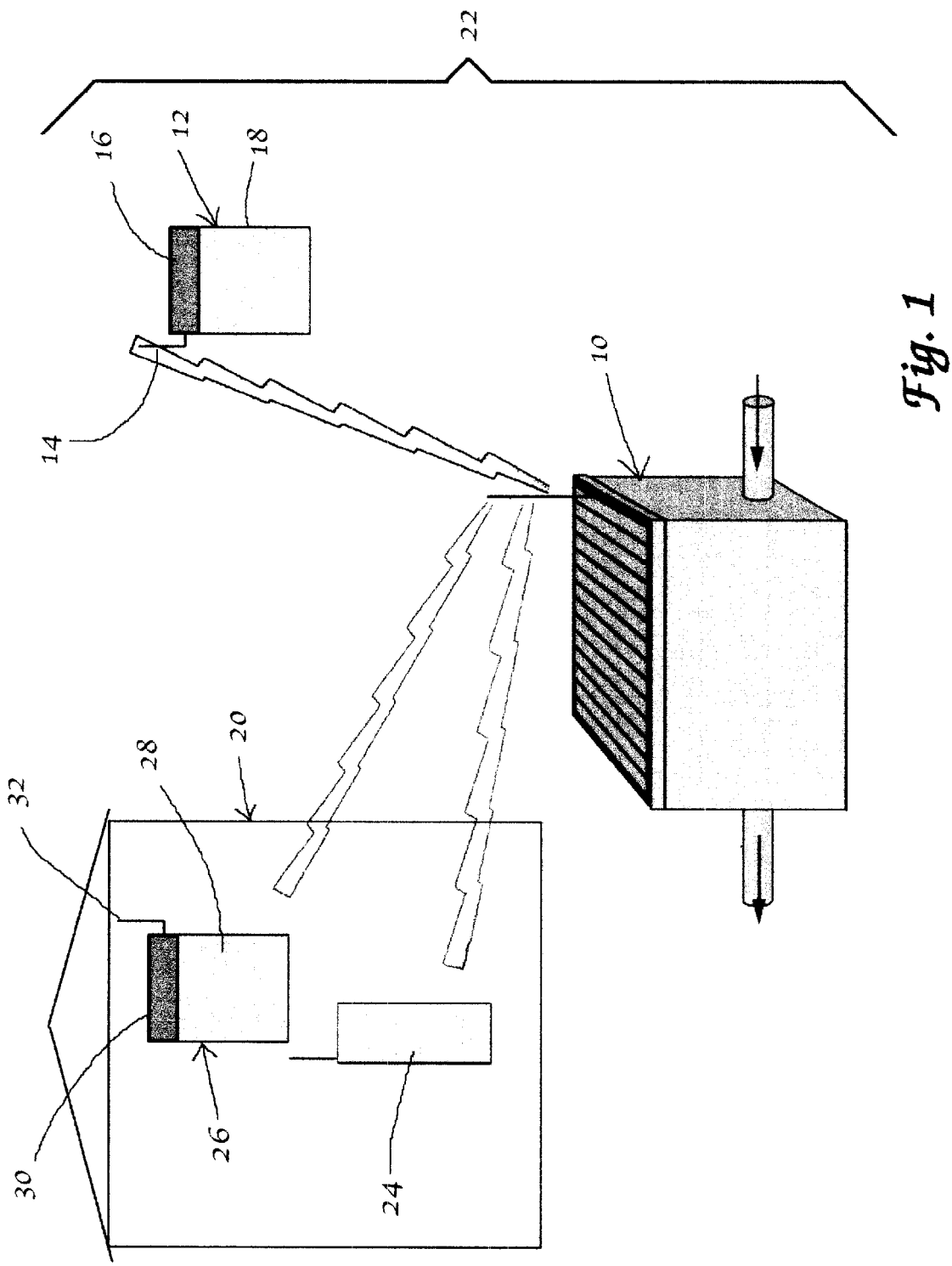
FIG. 1 is a simplified schematic diagram illustrating the manner of remotely controlling the water line shut off system according to the present invention.

This invention is directed to a remotely controlled water line shut off system that is especially suited for dwellings that may be idle for periods of time, such as summer rentals, where water damage, or broken and leaking sprinkler systems, may occur during such idle periods. The invention will now be described with regard to the two Figures, where like reference numerals represent like components or features in the respective views.

Figure 2:
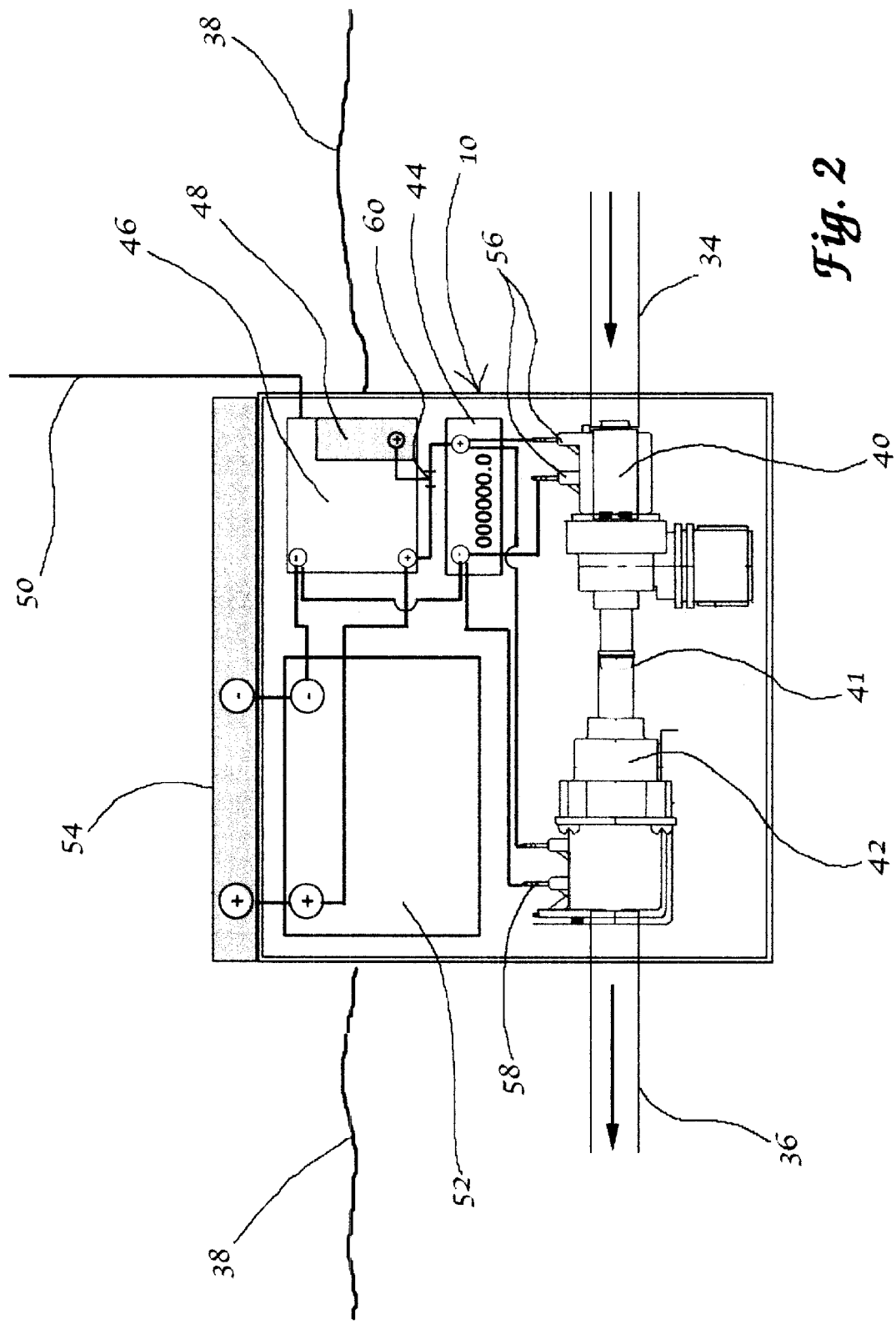
FIG. 2 is a side view, with parts removed, showing the ground mounted shut off valve mechanism forming a part of the invention.

Turning now to FIGS. 1 and 2, the overall system comprises a water shut off and metering housing 10, or enclosure, where one wall has been removed to reveal the internal components therewithin. In any case, the housing is preferably fabricated of polyvinyl chloride (PVC), where the internal components are controlled remotely by a handheld device 12, that may include an antenna 14, radio transmitter 16, and timing control mechanism 18, as known in the art, that might be used by the owner's agent, for example, without having to enter the dwelling 20 for which the system is being used. Alternately, or in support thereof, the system 22, as more clearly illustrated in FIG. 2, may be remotely controlled by a comparable remote unit 24 within the dwelling, or a wall mounted remote unit 26 that includes a year time clock 28, radio transmitter 30, and transmitter antenna 32.

FIG. 2 illustrates in detail the water shut off and metering housing 10, where the housing is positioned in line to the water intake line 34 and water outlet or discharge line 36, while a portion is exposed above ground level 38 for reasons to become apparent hereafter. The system 22 includes a water meter 40, as known commercially, positioned in direct fluid communication with the water intake line 34, and down stream therefrom and in communication with water meter 40 via conduit 41, a cut off valve 42 adjacent said discharge line 36, which transmits water to the dwelling 20 and/or in ground water sprinkler system, as commonly found at many structures.

Additionally, the system 22 includes a preset, quantity control metering means 44 to allow the owner/agent to preset the amount of water to pass through the system before a cut off thereof is imposed on the system. Further, the system 22 includes a solid state transceiver 46 incorporating a lawn sprinkler override cut off sensor 48 and antenna 50. Finally, to provide uninterrupted electrical power to the system 22, especially on those occasions while power may be lost during a severe storm, a storage battery 52 is included. Additionally, a solar collector 54, as known in the art, is provided for recharging of the storage battery to ensure continued operation of the system 22. Note that the solar collector 54 is above ground level 38 on the top of housing 10 and exposed to the sun rays.

As seen in FIG. 2, the respective internal components are in electrical communication with other components. For example, the storage battery 52 is electrically connected to the solid state transceiver 46, which in turn is electrically connected to the quantity control metering means 44. The quantity control metering means, through low voltage connectors 56, 58, respectively, to the water meter 40 and cut off valve 42, are included to complete the electrical circuitry.

To ensure peace of mind to the owner/agent responsible for the smooth operation of the dwelling, and to minimize internal damage or excessive water usage through the sprinkler system, this invention permits the owners or agents to leave the main public water connected and provides the capability of the owner/agent to shut off the supply by means of the 365 day time clock or timing control mechanism 18, or the hand held remote 12. Further, the 365 day time clock or timing control mechanism 18, can be preprogrammed for rentals or for the home owners return timetable. This system 22 can also be left on continuously for 365 days due to the built in lawn sprinkler over ride cut off switch or sensor 56. The built in switch or sensor override provides the owner/agent the ability to preset water meter 40, to discharge 20 to 300 gallons uninterrupted before a complete shutoff of the system activated by preset water meter 40, which activates the cutoff valve 42. Further, leaving the unit in it's programmed state will allow the sprinkler system to continue operation when premises are unattended. Quite often a sprinkler system may use in excess of the predetermined gallons of preset water meter 40, therefore, the lawn sprinkler over ride cut off switch or sensor 60 will disconnect preset water meter 40, while sprinkling. Upon sprinkling completion, the lawn sprinkler over ride cut off switch or sensor 60, cancels the open connection of the lawn sprinkler cut off switch 60. Aside from the lawn sprinkler over ride cut off sensor 60, the preset water meter 40, when reading and detecting an uninterrupted continuous discharge, will activate cutoff valve 42, shutting down the system until reset by the owner/agent by either the 365 day time clock 18, or the hand held remote 12.

It is recognized that changes, variations and modifications, particularly by those skilled in the art, may be made to the system of this invention without departing from the spirit and scope thereof. Accordingly, no limitation is intended to be imposed thereon except as set forth in the accompanying claims.

What is claimed is:

1. A remotely controlled water line shut off system for responding to inadvertant or excessive damand for water at a dwelling, wherein said dwelling includes aligned water intake and water discharge lines in fluid communication with each other for transmitting water to internal plumbing and an external sprinkler mechanism, said system comprising:
   a.) a housing situated between said water intake line and said water discharge line, said housing including the following components;
      i.) a water meter in direct fluid communication with said water intake line,
      ii.) a water cut off valve in fluid communication with said water discharge line, with a water conduit between said water meter and said water cut off valve,
      iii.) a preset quantity control metering means,
      iv.) a solid state radio transceiver for transmitting programmed signals to said control metering means, and
      v.) an electrical power source and circuitry bringing said components into electrical communication to effect a predetermined operation of said water cut off valve;
   b.) remote means in radio communication with said solid state radio transceiver to allow programming of said system from a remote location.

2. The remotely controlled water line shut off system according to claim 1, wherein said electrical power source includes a storage battery, and at least a portion of said housing is above ground level and mounts a solar collector for recharging said storage battery.

3. The remotely controlled water line shut off system according to claim 1, wherein said remote means is a handheld unit including a radio transmitter and a timing control mechanism to allow external operation of said system.

4. The remotely controlled water line shut off system according to claim 1, wherein said remote means is a fixed unit within said dwelling.

5. The remotely controlled water line shut off system according to claim 1, wherein said housing is fabricated of polyvinyl chloride.

6. The remotely controlled water line shut off system according to claim 1, including a programmable switch to override said water cut off valve to continue operating said system in a sprinkler mode.

7. The remotely controlled water line shut off system according to claim 1, wherein said solid state radio transceiver includes an antenna in wireless communication with said remote means.

8. The remotely controlled water line shut off system according to claim 1, including means to program a predetermined quantity of water transmitting said system before said water cut off valve is activated.

* * * * *